United States Patent
Schrader

(10) Patent No.: US 9,739,357 B2
(45) Date of Patent: Aug. 22, 2017

(54) HYDROSTATIC THRUST BEARING

(71) Applicant: Schaeffler Technologies AG & Co. KG, Herzogenaurach (DE)

(72) Inventor: Scott Schrader, Canton, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 264 days.

(21) Appl. No.: 14/590,402

(22) Filed: Jan. 6, 2015

(65) Prior Publication Data

US 2015/0198064 A1    Jul. 16, 2015

Related U.S. Application Data

(60) Provisional application No. 61/927,003, filed on Jan. 14, 2014.

(51) Int. Cl.
| | | |
|---|---|---|
| *F16H 41/24* | (2006.01) | |
| *F16H 41/04* | (2006.01) | |
| *F16H 45/02* | (2006.01) | |

(52) U.S. Cl.
CPC ............ *F16H 41/04* (2013.01); *F16H 41/24* (2013.01); *F16H 2045/0205* (2013.01); *F16H 2045/0221* (2013.01); *F16H 2045/0278* (2013.01)

(58) Field of Classification Search
CPC .................. F16H 2045/0205; F16H 2041/246
See application file for complete search history.

(56) References Cited

U.S. PATENT DOCUMENTS

| | | | |
|---|---|---|---|
| 5,125,487 A | | 6/1992 | Hodge |
| 5,806,644 A | * | 9/1998 | Hinkel ................... F16D 41/07 188/82.8 |
| 5,881,556 A | * | 3/1999 | Matsuoka ............... F16H 41/30 60/339 |
| 6,006,886 A | * | 12/1999 | Sasse ...................... F16H 41/28 192/113.5 |
| 6,231,309 B1 | | 5/2001 | Popoola et al. |
| 6,976,788 B2 | | 12/2005 | Honda et al. |
| 8,453,439 B2 | | 6/2013 | Peri |
| 2002/0180288 A1 | * | 12/2002 | Muramatsu ............. F16C 19/30 310/90 |
| 2011/0253497 A1 | * | 10/2011 | Tamura .................. F16D 41/066 192/45.02 |
| 2014/0298786 A1 | | 10/2014 | Lindemann |
| 2015/0068857 A1 | * | 3/2015 | Lindemann ............. F16D 33/18 192/3.28 |
| 2015/0152950 A1 | * | 6/2015 | Schrader ................. F16H 45/02 192/3.28 |
| 2015/0184701 A1 | * | 7/2015 | Lindemann ............. F16D 33/18 60/365 |

OTHER PUBLICATIONS

Harnoy, A., "Bearing Design in Machinery; Engineering Tribology and Lubrication"; Marcel Dekker Inc. (2002); Chpt. 10; pp. 212-266.

* cited by examiner

*Primary Examiner* — Stacey Fluhart
(74) *Attorney, Agent, or Firm* — Kevin L. Parks

(57) ABSTRACT

A torque converter comprising a stator including a base and an impeller including: an impeller shell; and, a hydrostatic thrust bearing. The hydrostatic thrust bearing comprising: a first bearing surface facing the stator; a recess geometry arranged for maintaining at least one hydrostatic pressure region for preventing the first bearing surface from contacting the stator; and, a fluid pathway between the stator and the impeller.

17 Claims, 5 Drawing Sheets

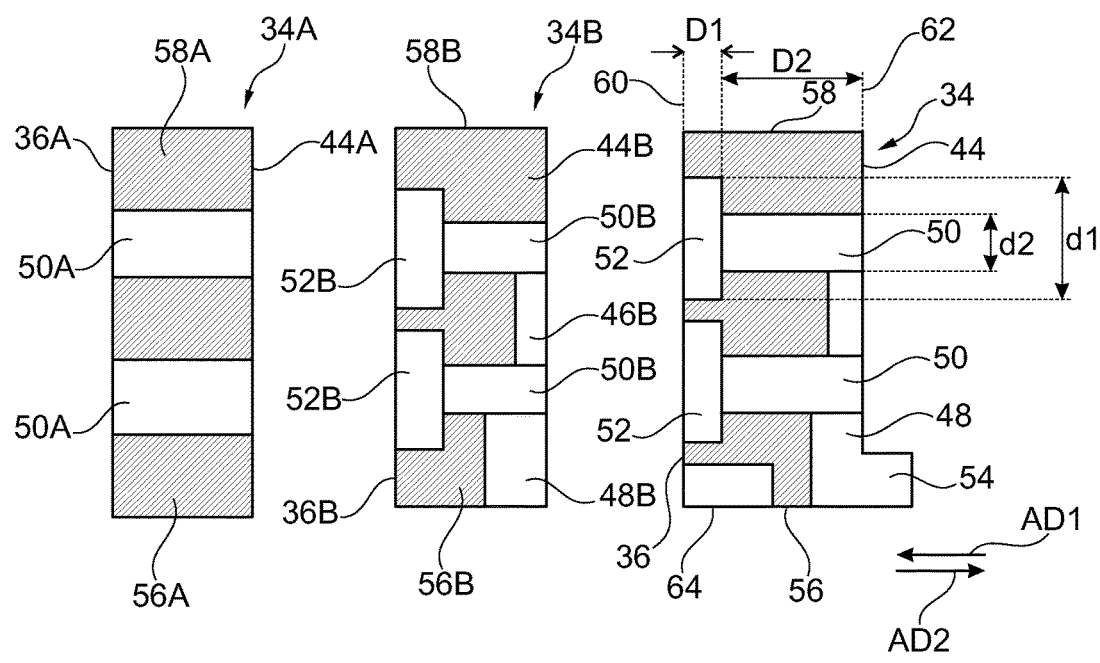

HYDROSTATIC THRUST BEARING

FIELD

The present disclosure relates generally to torque converters and more specifically to hydrostatic thrust bearings between stators and impellers in torque converters.

BACKGROUND

U.S. Pat. No. 5,125,487, hereby incorporated by reference herein, discloses thrust bearings mounted to the outside of an overrunning clutch.

U.S. Pat. No. 6,231,309, hereby incorporated by reference herein, discloses a torque converter reactor thrust washer.

U.S. Pat. No. 6,976,788, hereby incorporated by reference herein, discloses thrust bearings including lubricating grooves formed on a sliding surface.

U.S. Pat. No. 8,453,439, hereby incorporated by reference herein, discloses a torque converter including a washer for a thrust bearing.

Hydrostatic bearings are known, as described at pages 212-266 of *Bearing Design in Machinery: Engineering Tribology and Lubrication* (2002). Hydrostatic bearings are not known to be used in torque converters, especially between a stator and an impeller.

BRIEF SUMMARY

A torque converter is provided. The torque converter includes an impeller including an impeller shell and a stator including a base. The impeller and the stator generate a fluid flow therebetween. The impeller shell includes a hydrostatic thrust bearing axially between the stator and the impeller shell. The hydrostatic thrust bearing includes a bearing surface facing the stator. The bearing surface maintains a hydrostatic pressure region that prevents the bearing surface from contacting the stator.

A method for forming a torque converter is also provided. The method includes providing a hydrostatic thrust bearing surface opposite a stator such that a fluid flowing between the impeller shell and the stator maintains a hydrostatic pressure region that prevents the bearing surface from contacting the stator.

BRIEF DESCRIPTION OF THE DRAWINGS

The nature and mode of operation of the present invention will now be more fully described in the following detailed description of the invention taken with the accompanying drawing figures, in which:

FIGS. 3A-3C illustrates cross-sectional views of a hydrostatic thrust bearing for use between an impeller and a stator in accordance with an example aspect;

DETAILED DESCRIPTION

At the outset, it should be appreciated that like drawing numbers appearing in different drawing views identify identical, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described.

The present disclosure provides a hydrostatic thrust bearing including a recess geometry for forming at least one hydrostatic pressure region on the bearing surface. Herein, the term 'hydrostatic thrust bearing' may also be referred to interchangeably as 'hydrostatic bearing' or simply as 'bearing'. In an example aspect, the hydrostatic thrust bearing is fixed to the impeller; however, as one skilled in the art appreciates, alternatively the bearing disclosed may be integrated into or otherwise affixed to the stator. The bearing advantageously maintains at least one hydrostatic pressure region on the bearing surface that prevents the bearing surface from coming into contact with the stator in an example aspect.

The following description is made with reference to FIGS. 1-5. Without being bound by theory, it is believed that the hydrostatic thrust bearing disclosed herein utilizes an external pump forcing oil between the stator and the impeller to form an oil or film pressure region at the bearing surface, also referred to interchangeably herein as the first bearing surface. The thrust bearing has at least one recess where a uniformly high pressure is maintained by external pump 90, which is, in one example aspect, part of the transmission. The external pump, referred to as transmission pump interchangeably herein, also supplies pressure to engage transmission clutches and fluid flow to cool the transmission and torque converter. The recess geometry of the the hydrostatic thrust bearing is variable and may include circular, rectangular, or other geometrically shaped recesses, or combinations thereof. The recess geometry of the hydrostatic thrust bearing may be formed by known methods in the art, and in an example aspect, is advantageously and economically formed by stamping.

Figure 1:
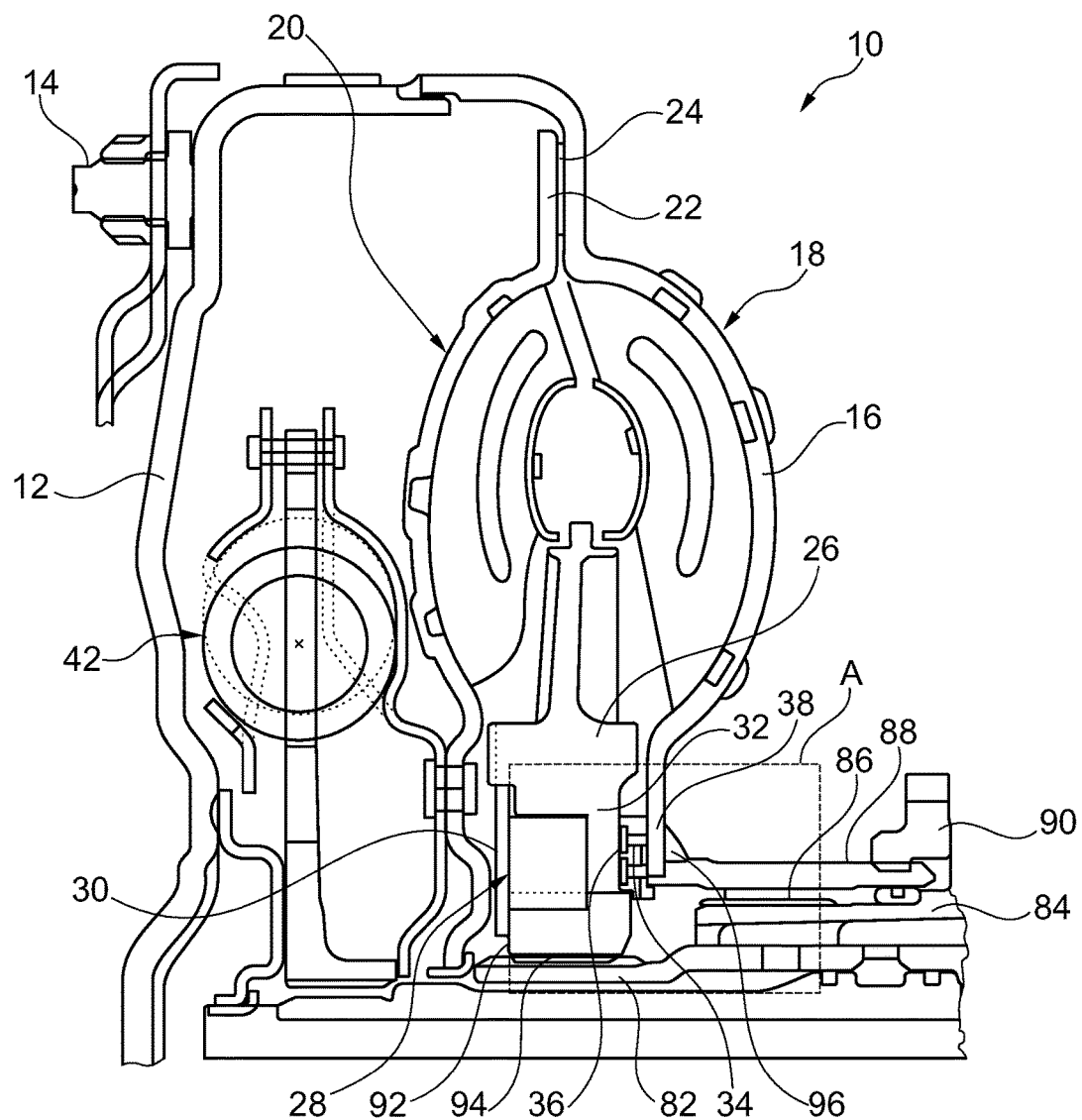
FIG. 1 illustrates a cross-sectional side view of a torque converter in accordance with an example aspect.

FIG. 1 illustrates a cross-sectional side view of a torque converter in accordance with an example aspect. Torque converter 10 includes a front cover 12 for connecting to a crankshaft of an internal combustion engine via stud 14 and a rear cover 16, also referred to as impeller shell interchangeably herein, for an impeller 18. Impellers are sometimes referred to in the art interchangeably as 'pump'; however, for clarity 'pump' herein is used to denote external or transmission pump 90.

Torque converter 10 also includes turbine 20 including an outer radial extension 22 radially protruding outwardly from an outer circumference of a blade supporting portion of turbine 20. Turbine 20 is configured to be axially slidable toward and away from impeller 18 to engage and disengage impeller 18. A friction material 24 is bonded onto a surface of outer radial extension 22 for engaging rear cover 16. Turbine 20 is connected to a damper assembly 42 that is drivable by turbine 20 and is positioned between turbine 20 and front cover 12. Torque converter 10 also includes stator 26 between turbine 20 and impeller 18 and a one-way clutch 28 supporting stator 26. A side plate 30 holds one-way clutch 28 in place within stator 26. Stator 26 includes stator base 32.

In an example aspect, torque converter 10 comprises stator 26 including base 32 and impeller 18 including impeller shell 16. Impeller 18 includes hydrostatic thrust bearing 34 axially situated between impeller 18 and stator 26, more specifically between extended portion of impeller shell 38 and stator base 32. Hydrostatic thrust bearing 34 includes first bearing surface 36 facing the stator, a recess geometry arranged for maintaining at least one hydrostatic pressure region 40 (see FIG. 2) on bearing surface 36 that prevents bearing surface 36 from coming into contact with stator 26, and a fluid pathway between the stator and the impeller. External or transmission pump 90 includes an outlet for providing a hydrostatic pressure in fluid communication with hydrostatic thrust bearing 34 including the fluid pathway.

Impeller 18 includes impeller shell 16 including extended shell portion 38 and hydrostatic thrust bearing 34 having hydrostatic thrust bearing surface 36 that faces axial surface of stator base 32. Hydrostatic thrust bearing surface 36 may be referred to interchangeably herein as bearing surface or first bearing surface. Hydrostatic thrust bearing 34 includes a recess geometry to provide for forming at least one hydrostatic pressure region on bearing surface 36. The recess geometry includes cavity or void space or a combination of void spaces to create an interconnected pathway for fluid flow.

Torque converter 10 further includes stator shaft 82, support shaft 84, bushing 86, hub 88, and inner race 92. The portion of torque converter 10 noted by dashed outline of box 'A' is expanded in FIG. 2.

Figure 2:
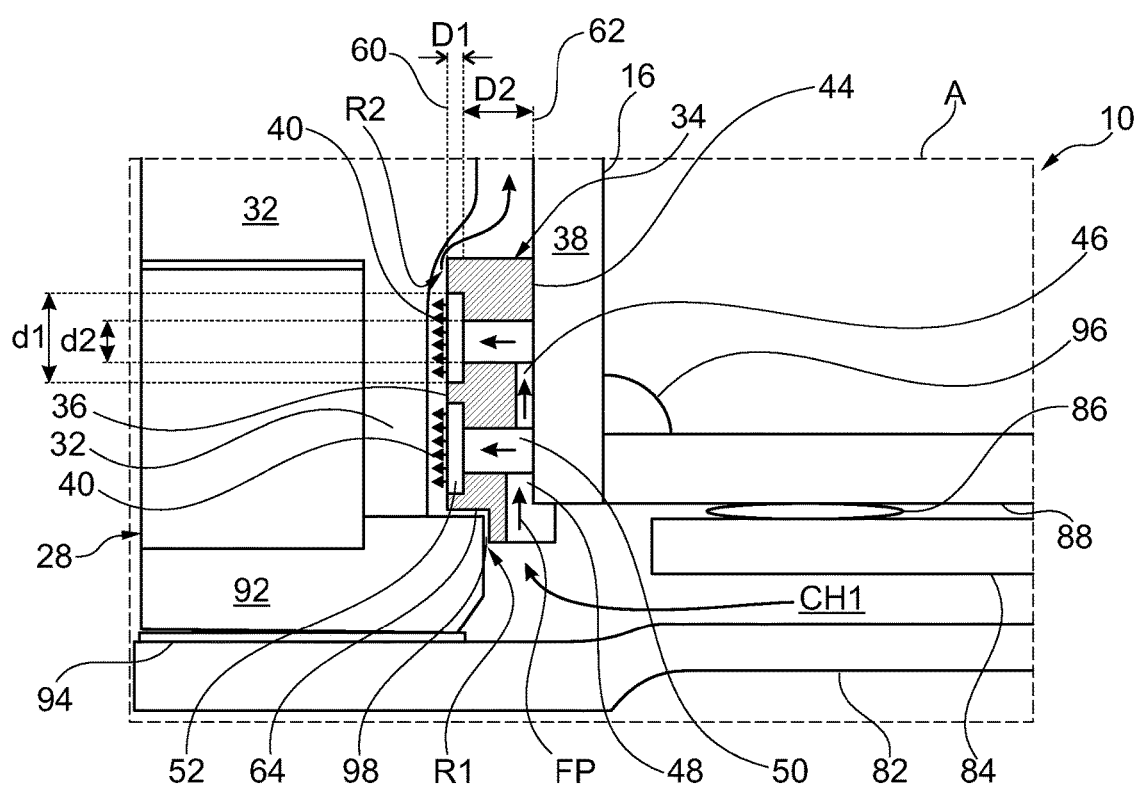
FIG. 2 shows an expanded view of a cross-sectional side view of the torque converter (labeled box 'A' of FIG. 1) illustrating the fluid flow through a hydrostatic thrust bearing in accordance with an example aspect.

FIG. 2 shows an expanded view of a cross-sectional side view of torque converter 10 corresponding to box A of FIG. 1. Torque converter 10 includes stator base 32, stator base 32, one-way clutch 28, inner race 92, spline 94, gap 98 (between inner race 92 and hydrostatic bearing 34), stator shaft 82, support shaft 84, bushing 86, hub 88, weld 96, extended portion 38 of impeller shell 16, and hydrostatic thrust bearing 34. Hydrostatic bearing 34 is fixed to the impeller shell by brazing or other methods as known in the art. Hydrostatic bearing 34 is made of steel, aluminum, or other suitable material.

Bearing 34 includes bearing surface 36, also referred to as first bearing surface, including hydrostatic high pressure regions 40. Hydrostatic high pressure regions 40 are believed to be formed, at least in part, by external pump 90 forcing fluid or lubricant flow through channel CH1, wherein fluid pathway FP is fed though hydrostatic thrust bearing 34 via groove 48 into the interconnected fluid pathway formed by the void spaces including first openings 52, second openings 50, and grooves 46, 48. First restrictive opening R1, located at gap 98 between notch 64 of bearing 34 and inner race 92 also receives fluid flow from channel CH1; however, predominantly fluid is forced to flow through the recess geometry of bearing 34. Second restrictive opening R2 is located between stator 26 and bearing 34. Restrictive openings R1 and R2 are sufficiently small to ensure and maintain pressure build up on bearing surface 36, thereby, maintaining hydrostatic high pressures regions 40 and preventing stator 26 from coming into contact with impeller 18.

Torque converter 10 includes hydrostatic thrust bearing 34 including a recess geometry having a first portion 60, or first thickness, disposed axially inward, or in other words, away from first bearing surface 36. First portion 60 includes at least one first opening 52 having a first diameter 'd1' and a first depth 'D1'. A second portion 62, or second thickness, disposed axially inward, or in other words, away from first portion 60 includes at least one second opening 50 having a second diameter 'd2' and a second depth 'D2'. Second depth D2 extends to a second bearing surface 44. Second bearing surface 44, also referred to as opposite bearing surface, faces impeller 18. In an example aspect, more particularly, second bearing surface 44 faces extended portion 38 of impeller 18. Second portion 62 further includes at least one groove 48 also extending to second bearing surface 44. First diameter d1 is greater than second diameter d2 and first depth D1 is less than second depth D2.

FIG. 2 illustrates the fluid flow through a hydrostatic thrust bearing in accordance with an example aspect. Fluid flow FP, also referred to as fluid pathway or interconnected fluid pathway interchangeably herein, is indicated by the arrows in FIG. 2. Fluid pathway FP is pumped between stator 26 and impeller 18. Fluid flow passes through from opposite bearing surface 44 through to first bear surface 36 via interconnected recess geometry including void spaces such as first openings 52, second openings 50, grooves 46, 48, or combinations thereof. Hydrostatic thrust bearing 34 includes at least one pathway FP arranged for fluid communication via the at least one groove 46 and/or 48 through second portion 62 and further through first portion 60. Fluid pathway FP extends interconnectedly from opposite bearing surface 44 through to first bearing surface 36.

In an example aspect, the recess geometry of hydrostatic thrust bearing 34 is formed by known forming or shaping methods in the art such as piercing, coining, grooving, or combinations thereof. FIGS. 3A-3C illustrate cross-sectional views of a hydrostatic thrust bearing for use between an impeller and a stator in accordance with an example aspect. Hydrostatic thrust bearing (34A, 34B) 34 includes outer edge diameter (58A, 58B) 58 and inner edge diameter (56A, 56B) 56. Inner and outer edge diameters are circumferentially disposed. Hydrostatic bearing 34A in FIG. 3A includes piercings. In other words, the bearing is pierced to reveal at least one axially disposed pathway or opening 50A, which are substantially devoid of bearing material, wherein the pathways extend from the opposite or second bearing surface 44A through to the first bearing surface 36A. Fluid flow is possible through the pierced pathways in hydrostatic bearing 34A.

FIG. 3B shows the hydrostatic bearing of FIG. 3A wherein the recess geometry also includes coining. In other words, the hydrostatic bearing 34B is further coined to reveal radial displacements of material to create voids 52B interconnected with openings or pathways 50B. Coined areas or voids are denoted as 52B on FIG. 3B, and also as small groove 46B and large groove 48B. Fluid flow is possible through the pierced and coined interconnected pathways in hydrostatic bearing 34B.

In an example aspect, hydrostatic thrust bearing 34 further includes a centering feature disposed at inner edge diameter 56 and protruding away from second bearing surface 44 in axial direction AD2. FIG. 3C shows the hydrostatic bearing of FIG. 3B further including offset portion 54. Hydrostatic bearing 34 of FIG. 3C includes inner edge diameter 56 and outer edge diameter 58. Inner edge diameter 56 is further coined, or otherwise displaced axially in direction AD2, to provide void portion 60 adjacent to first bearing surface 36 and offset portion 54 adjacent to and protruding out from opposite bearing surface 44. Offset portion 54 is discontinuous in the circumferential direction. In other words, in circumferentially offset portions wherein offset portion 54 includes solid material (not shown), offset portion 54 serves as a centering feature and is fitted to attach to impeller shell extended portion 38. Hydrostatic thrust bearing 34 further includes void portion or notch 64 disposed at inner edge diameter 56 and extending away in direction AD2 from first bearing surface 36. Void portion or notch 64 is designed to accommodate and clear the shape of inner race 92. Gap 98 (FIG. 2) defines the space between hydrostatic thrust bearing 34 and notch 64.

Figures 4A, 4B:
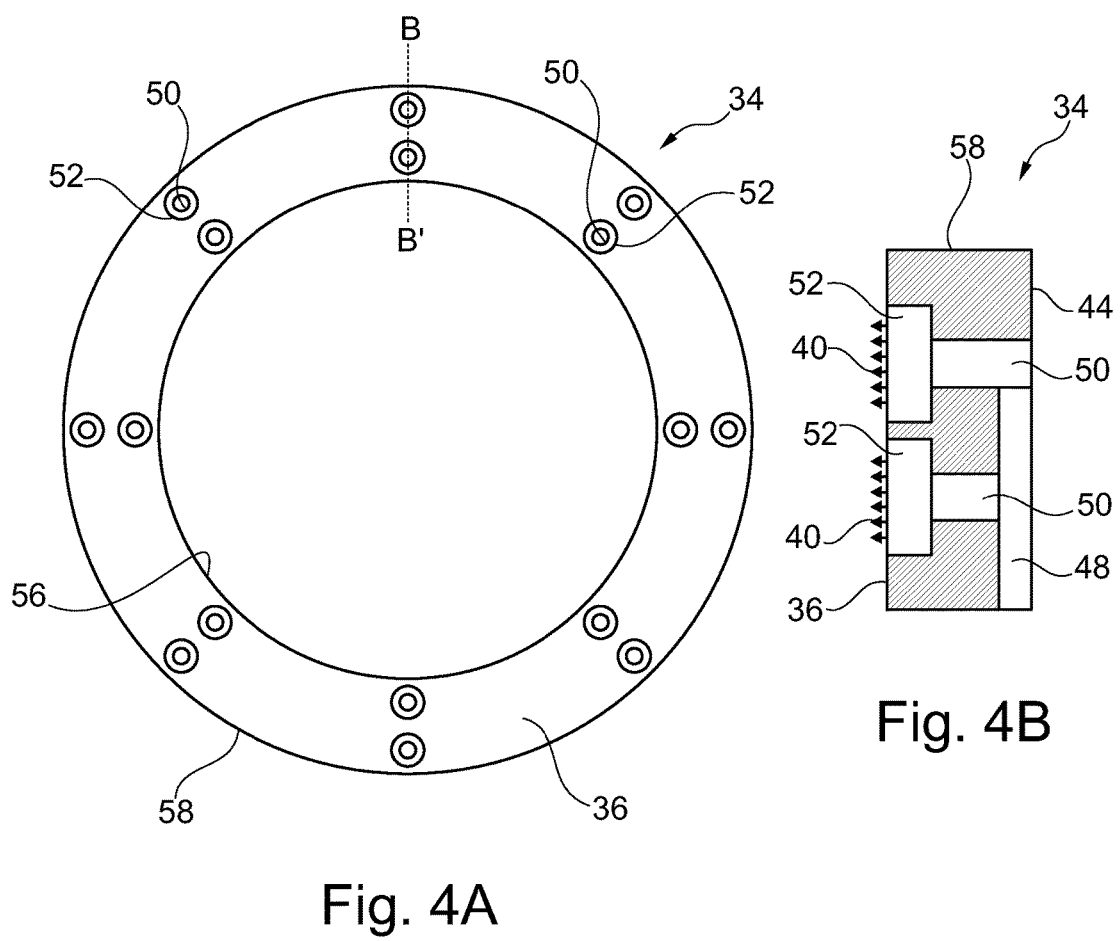
FIG. 4A illustrates a front view of a hydrostatic thrust bearing for use between an impeller and a stator in accordance with an example aspect and FIG. 4B illustrates a cross-sectional view of the thrust bearing along B-B' of FIG. 4A.

FIG. 4A illustrates a front view of a hydrostatic thrust bearing for use between an impeller and a stator in accordance with an example aspect. Hydrostatic thrust bearing 34 includes first bearing surface 36, opposite or second bearing surface 44 (not shown), inner edge diameter 56, outer edge diameter 58, coined areas 52, openings 50, and groove 48 (not shown). Recesses as defined by interconnected coined areas 52, openings 50, and grooves 48 may be aligned radially as shown by line B-B'. In an example aspect, recesses are repeated circumferentially and are evenly spaced; however, the number of recesses are not limited herein.

FIG. 4B illustrates a cross-sectional view of the thrust bearing along B-B' of FIG. 4A. Hydrostatic bearing 34 of FIG. 4A includes a recess geometry having first bearing surface 36, opposite or second bearing surface 44, inner edge diameter 56, outer edge diameter 58, coined areas 52, openings 50, and groove 48. The coined areas 52, openings 50, and groove 48 are interconnected and form a fluid flow pathway allowing for fluid flow axially from opposite surface 44 through to bearing surface 36. Hydrostatic high pressure regions 40 are formed on bearing surface 36. Hydrostatic thrust bearing 34 optionally comprises a wear resistant material affixed to the first bearing surface (not shown). The wear resistant material includes wear resistant polymer, such as polyether ether ketone (PEEK) or polyamide-imide produced by TORLON or other suitable wear resistant material. As known in the art, wear resistant material may be applied to hydrostatic bearing surface 36 by pressure sensitive adhesive.

Figure 5:
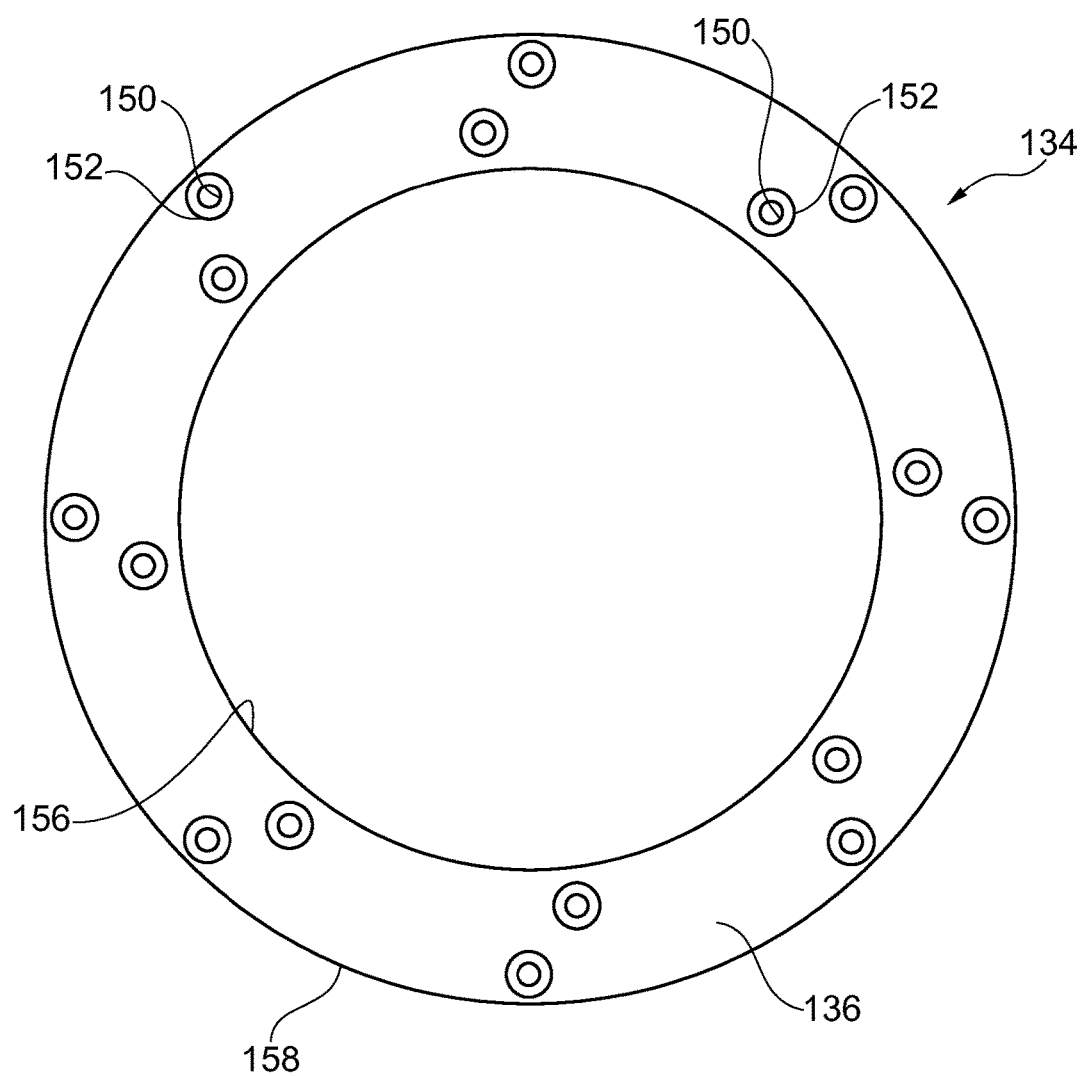
FIG. 5 illustrates another front view of a hydrostatic thrust bearing in accordance with an example aspect.

FIG. 5 illustrates an alternate front view of a hydrostatic thrust bearing in accordance with an example aspect. Hydrostatic thrust bearing 134 includes first bearing surface 136, opposite or second bearing surface 144 (not shown), inner edge diameter 156, outer edge diameter 158, coined areas 152, openings 150, and groove 148 (not shown). Recesses as defined by interconnected coined areas 152, openings 150, and grooves 148 may be radially offset as shown. Recess geometries and alignment of recesses are variable.

In an example aspect, a transmission is disclosed comprising a torque converter comprising a stator including a base and an impeller including an impeller shell and a hydrostatic thrust bearing. The hydrostatic thrust bearing includes a first bearing surface facing the stator; a recess geometry arranged for maintaining at least one hydrostatic pressure region for preventing the first bearing surface from contacting the stator; and, a fluid pathway between the stator and the impeller. The transmission further includes a transmission pump including an outlet for providing a hydrostatic pressure in fluid communication with the fluid pathway.

Referring again to FIGS. 1-5, a method of preventing contact between an impeller and a stator in a torque converter is disclosed, the method comprising (i) providing hydrostatic thrust bearing 34 including first bearing surface 36 facing stator 26, second bearing surface 44 facing impeller 18, and a recess geometry arranged for maintaining at least one hydrostatic high pressure region 40 on first bearing surface 36; (ii) fixing the hydrostatic thrust bearing 34 to impeller 18; (iii) pumping fluid through the recess geometry to form and maintain the at least one hydrostatic high pressure region 40 on first bearing surface 36, and (iv) maintaining fluid pathway FP between stator 26 and impeller 18. In an example aspect, the step of fixing hydrostatic thrust bearing 34 to impeller 18 includes brazing.

In an example aspect, the method includes hydrostatic thrust bearing 34 further comprising first portion 60 including at least one first opening 52 having first diameter d1 and first depth D1 and second portion 62 including at least one second opening 50 having second diameter d2 and second depth D2, second depth D2 extending to second bearing surface 44 facing impeller 18, where first diameter d1 is greater than second diameter d2 and first depth D1 is less than second depth D2. The method comprises hydrostatic thrust bearing 34 including at least one groove 46, 48 extending to second bearing surface 44 in an example aspect.

In another example aspect, hydrostatic thrust bearing 34 of the method includes at least one pathway FP arranged for fluid communication via the at least one groove 46, 48 through second portion 62 and further through first portion 60. In an example aspect, hydrostatic thrust bearing 34 of the method includes outer edge diameter 58 and inner edge diameter 56.

In an example aspect, the method includes coining notch 64 and a centering feature, each disposed at inner edge diameter 56 of hydrostatic thrust bearing 34, wherein the centering feature protrudes away from second bearing surface 44. In an example aspect, the method further comprises affixing a wear resistant material to first bearing surface 36.

Of course, changes and modifications to the above examples of the invention should be readily apparent to those having ordinary skill in the art, without departing from the spirit or scope of the invention as claimed. Although the invention is described by reference to specific preferred and/or example embodiments, it is clear that variations can be made without departing from the scope or spirit of the invention as claimed.

I claim:

1. A torque converter comprising:
   a stator including a base;
   an impeller including:
   an impeller shell; and,
   a hydrostatic thrust bearing including:
      a first bearing surface facing the stator;
      a recess geometry arranged for maintaining at least one hydrostatic pressure region for preventing the first bearing surface from contacting the stator; and,
      a fluid pathway between the stator and the impeller;
   wherein the recess geometry of the hydrostatic thrust bearing includes:
   a first portion including at least one first opening having a first diameter and a first depth; and
   a second portion including at least one second opening having a second diameter and a second depth, the second depth extending to a second bearing surface facing the impeller;
   where the first diameter is greater than the second diameter and the first depth is less than the second depth; and, wherein the depths of the portions are along an axial direction along which the recess geometry extends.

2. The torque converter as recited in claim 1 wherein the second portion further includes at least one groove extending to the second bearing surface.

3. The torque converter as recited in claim 2 wherein the hydrostatic thrust bearing includes at least one pathway arranged for fluid communication via the at least one groove through the second portion and further through the first portion.

4. The torque converter as recited in claim 1 wherein the hydrostatic thrust bearing further includes an outer edge diameter and an inner edge diameter.

5. The torque converter as recited in claim 4 wherein the hydrostatic thrust bearing further includes a centering feature disposed at the inner edge diameter and protruding away from the second bearing surface.

6. The torque converter as recited in claim 4 wherein the hydrostatic thrust bearing further includes a notch disposed at the inner edge diameter.

7. The torque converter as recited in claim 1 where the hydrostatic thrust bearing is formed by stamping.

8. The torque converter as recited in claim 7 where the hydrostatic thrust bearing is formed by piercing, coining, grooving, or combinations thereof.

9. The torque converter as recited in claim 1 where the hydrostatic thrust bearing is fixed to the impeller by brazing.

10. The torque converter as recited in claim 1 wherein the hydrostatic thrust bearing comprises a wear resistant material affixed to the first bearing surface.

11. A transmission comprising the torque converter as recited in claim 1 and a transmission pump including an outlet for providing a hydrostatic pressure in fluid communication with the fluid pathway.

12. A method of preventing contact between an impeller and a stator in a torque converter, the method comprising:
providing a hydrostatic thrust bearing including:
a first bearing surface facing the stator and a second bearing surface facing the impeller; and,
a recess geometry arranged for maintaining at least one hydrostatic high pressure region on the first bearing surface;
fixing the hydrostatic thrust bearing to the impeller;
pumping fluid through the recess geometry to form and maintain the at least one hydrostatic high pressure region on the first bearing surface, and
maintaining a fluid pathway between the stator and the impeller;
wherein the hydrostatic thrust bearing comprises:
a first portion including at least one first opening having a first diameter and a first depth; and
a second portion including at least one second opening having a second diameter and a second depth, the second depth extending to a second bearing surface facing the impeller;
where the first diameter is greater than the second diameter and the first depth is less than the second depth; and,
wherein the depths of the portions are along an axial direction along which the recess geometry extends.

13. The method as recited in claim 12 wherein the hydrostatic thrust bearing includes at least one groove extending to the second bearing surface.

14. The method as recited in claim 13 wherein the hydrostatic thrust bearing includes at least one pathway arranged for fluid communication via the at least one groove through the second portion and further through the first portion.

15. The method as recited in claim 12 wherein the hydrostatic thrust bearing further includes an outer edge diameter and an inner edge diameter.

16. The method as recited in claim 12 wherein the step of fixing the hydrostatic thrust bearing to the impeller includes brazing.

17. The method as recited in claim 12 further comprising affixing a wear resistant material to the first bearing surface.

* * * * *